United States Patent
Zhu et al.

(10) Patent No.: US 10,693,171 B2
(45) Date of Patent: Jun. 23, 2020

(54) SYSTEM AND METHOD FOR PREPARING HIGH PURITY VANADIUM ELECTROLYTE (71) Applicants: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

(72) Inventors: Qingshan Zhu, Beijing (CN); Haitao Yang, Beijing (CN); Chuanlin Fan, Beijing (CN); Wenheng Mu, Beijing (CN); Jibin Liu, Beijing (CN); Cunhu Wang, Beijing (CN); Qixun Ban, Beijing (CN)

(73) Assignees: INSTITUTE OF PROCESS ENGINEERING, CHINESE ACADEMY OF SCIENCES, Beijing (CN); BEIJING ZHONGKAIHONGDE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/074,080

(22) PCT Filed: Jan. 16, 2017

(86) PCT No.: PCT/CN2017/071204
§ 371 (c)(1),
(2) Date: Jul. 30, 2018

(87) PCT Pub. No.: WO2017/128966
PCT Pub. Date: Aug. 3, 2017

(65) Prior Publication Data
US 2019/0044174 A1 Feb. 7, 2019

(30) Foreign Application Priority Data

Jan. 28, 2016 (CN) .......................... 2016 1 0059580

(51) Int. Cl.
*H01M 8/18* (2006.01)
*B01J 4/00* (2006.01)
(Continued)

(52) U.S. Cl.
CPC ............. *H01M 8/188* (2013.01); *B01J 4/008* (2013.01); *B01J 8/007* (2013.01); *B01J 8/0045* (2013.01);
(Continued)

(58) Field of Classification Search
CPC ....... B01J 4/00; B01J 4/008; B01J 8/00; B01J 8/0015; B01J 8/0045; B01J 8/005;
(Continued)

(56) References Cited

FOREIGN PATENT DOCUMENTS

| CN | 103515642 A | * | 1/2014 | |
| CN | 103606694 A | * | 2/2014 | |
| WO | WO-8905363 A1 | * | 6/1989 | ............. C01G 31/00 |

OTHER PUBLICATIONS

Machine translation of CN 103515642 A, which was published on Jan. 15, 2014. (Year: 2014).*

(Continued)

*Primary Examiner* — Natasha E Young
(74) *Attorney, Agent, or Firm* — Bayramoglu Law Offices LLC (57) ABSTRACT A system and method for preparing a high-purity vanadium electrolyte, comprising preparing a low-valence vanadium oxide with vanadium oxytrichloride by ammonium salt precipitation and fluidization reduction, and preparing the high-purity vanadium electrolyte at a low temperature by adding a sulfuric acid solution and clean water under the (Continued)

conditions of ultrasound-assisted dissolution and activation. Efficient utilization of heat is achieved through heat exchange between the ammonium salt and the reduction tail gas and heat exchange between the reduction product and fluidized nitrogen gas. Ammonia gas in the reduction tail gas is recovered for precipitation of vanadium to achieve the recycling of ammonia gas. An internal member is arranged in the reduction fluidized bed to realize the precise regulation of the valence state of the reduction product. Furthermore, ultrasound-assisted dissolution and activation are employed to prepare the vanadium electrolyte at a low temperature, thereby improving the activity of the electrolyte.

10 Claims, 1 Drawing Sheet (51) Int. Cl.
*B01J 8/00* (2006.01)
*B01J 8/18* (2006.01)
*B01J 14/00* (2006.01)
*C01G 31/02* (2006.01)

(52) U.S. Cl.
CPC ........... *B01J 8/0055* (2013.01); *B01J 8/1818* (2013.01); *B01J 8/1836* (2013.01); *B01J 14/00* (2013.01); *C01G 31/02* (2013.01); *H01M 8/18* (2013.01); *B01J 2208/00752* (2013.01); *B01J 2208/00761* (2013.01); *H01M 2300/0011* (2013.01); *Y02E 60/528* (2013.01); *Y02P 70/56* (2015.11)

(58) Field of Classification Search
CPC ... B01J 8/0055; B01J 8/007; B01J 8/18; B01J 8/1818; B01J 8/1836; B01J 14/00; B01J 19/00; B01J 19/24; B01J 2208/00743; B01J 2208/00752; B01J 2208/00761; C01G 31/00; C01G 31/02; H01M 8/00; H01M 8/18; H01M 8/184; H01M 8/188; H01M 2300/00; H01M 2300/0002; H01M 2300/0005; H01M 2300/0008; H01M 2300/0011; Y02E 60/00; Y02E 60/50; Y02E 60/52; Y02E 60/528; Y02P 70/00; Y02P 70/50; Y02P 70/56
See application file for complete search history.

(56) References Cited

OTHER PUBLICATIONS

Machine translation of CN 1036066942 A, which was published on Feb. 26, 2014. (Year: 2014).*

* cited by examiner

SYSTEM AND METHOD FOR PREPARING HIGH PURITY VANADIUM ELECTROLYTE

CROSS REFERENCE TO RELATED APPLICATIONS

This application is based is based upon and claims priority to PCT Application Number PCT/CN2017/071204, WO 2017/128966, filed on Jan. 16, 2017, which stems from Chinese Application Number 201610059580.0 filed on Jan. 28, 2016, both of which are incorporated herein by reference in their entirety.

TECHNICAL FIELD

The present invention relates to the fields of energy and chemical engineering, and more particularly to a system and method for preparing a high-purity vanadium electrolyte.

BACKGROUND

Traditional fossil fuels have always been the main source of energy, however, long-term exploitation and heavy use results in depletion of resources and also brings about serious environmental pollution. The development and utilization of clean renewable energy sources such as wind, water, solar, and tidal energies have gradually attracted the attention of human society. However, renewable energy sources are difficult to be effectively used by the existing energy management systems due to their inherent intermittence.

Energy storage technology is one of ways to solve such problems. In various kinds of energy storage systems, the all-vanadium redox flow battery (VRB) is an attractive energy storage device. The biggest advantage of VRB is its flexibility—power and energy storage capacity are independent. The power of VRB depends on the number of battery cells and the effective electrode area of battery cells, while the energy storage capacity depends on the concentration of the active material in the electrolyte and the volume of the electrolyte. Each battery cell consists of two electrode chambers (positive and negative electrode chambers) separated by a proton exchange membrane. The electrolyte, that is the sulfate solution of vanadium, is used to store energy. When the electrolyte flows through the battery cell, redox reactions of V(IV)/V(V) and V(II)/V(III) occur in the positive and negative electrode chambers, respectively. The vanadium electrolyte is a vital component of the all-vanadium redox flow battery.

The new vanadium battery stack is generally configured using a mixed vanadium electrolyte with a concentration ratio of V(III) to V(IV) of 1:1, that is, the average valence of vanadium ions in the electrolyte is 3.5. Such electrolyte can be directly added to the positive and negative electrode chambers for use, which is easy to operate.

The purity of the vanadium electrolyte plays a crucial role in performances of the battery, and high concentration of impurities in the electrolyte will bring about the following problems: (1) there is a competitive reaction between impurity ions and vanadium ions, which reduces the efficiency of the battery. (2) In the positive electrode chamber, impurity ions are deposited on the graphite felt electrode, which results in the blockage of the gap in the graphite felt and reduction of the specific surface area of the graphite felt, thus affecting charge and discharge efficiencies. (3) In the negative electrode chamber, impurity ions will affect the hydrogen evolution over-potential, and the production of the gas will affect the pressure balance inside the battery. (4) Impurity ions reduce the lifetime of the proton exchange membrane. (5) Impurity ions affect the stability of vanadium ions, leading to premature aging of the electrolyte.

The activity of the vanadium electrolyte refers to the effective concentration of the vanadium ions in the electrolyte that can be used for charge and discharge. The vanadium ions in the electrolyte are affected by the temperature, impurities, etc., and an oxygen-bridge bond will be formed, which results in the production of polycondensation, and the reduction of the electrochemical activity. Therefore, increasing the activity of the vanadium electrolyte can effectively improve the utilization efficiency of the vanadium resources, thus reducing the cost of the vanadium battery.

The methods for preparing the VRB electrolyte are as follows: (1) $VOSO_4$ method: U.S. Pat. No. 849,094 discloses a mixed vanadium electrolyte with a concentration ratio of V(III) to V(IV) of 1:1, which is prepared by dissolving $VOSO_4$ in a sulfuric acid solution, and then adjusting the valence state electrochemically. The main problem of this method lies in the more complicated preparation process of $VOSO_4$ and high price, which is not conducive to the large-scale application in VRB. $VOSO_4$ is difficult to be highly purified, thus the electrolyte prepared by such process contains more impurities. Electrochemical treatment is required to adjust the concentration ratio of V(III) to V(IV) to 1:1, so that the average valence of vanadium ions in the electrolyte is 3.5. (2) Chemical reduction method: Chinese patent CN101562256 discloses a mixed vanadium electrolyte of V(III) and V(IV), which is prepared by adding a reducing agent such as oxalic acid, butyraldehyde, etc. to the mixed system of $V_2O_5$ and a sulfuric acid solution, and keeping the mixture at 50-100° C. for 0.5-10 hours for chemical reduction. The main problem of the method lies in that it is not easy to achieve the precise control over the degree of reduction. $V_2O_5$ prepared by the existing process is difficult to be highly purified, and the electrolyte prepared by such process contains more impurities. Addition of the reducing agent will introduce a new impurity into the vanadium electrolyte system, thereby affecting the purity of the electrolyte. (3) Electrolytic method: International PCT patent AKU88/000471 describes a mixed vanadium electrolyte with a concentration ratio of V(III) to V(IV) of 1:1, which is prepared by adding the activated $V_2O_5$ to a sulfuric acid solution, and then performing constant current electrolysis. Preparation of the vanadium electrolyte by the electrolytic method is suitable for large-scale production of the electrolyte, but the process requires a preliminary activating treatment, which needs an additional electrolysis device and consumes electrical energy. Also, there is the problem of the electrolyte containing more impurities. (4) Method by dissolving a low-valence vanadium oxide: Chinese patent CN101728560A discloses that the high-purity $V_2O_3$ is used as a raw material and dissolved in 1:1 dilute sulfuric acid at a temperature of 80-150° C. to prepare a solution of $V_2(SO_4)_3$ used as a negative electrode electrolyte. The main problem of the process lies in that it is operated at a temperature of 80-150° C. (at which temperature the V(III) vanadium ion hydrate is prone to form an oxygen-bridge bond, leading to the production of polycondensation and thus a decreased electrolyte activity), and lacks an activation step. This method can only be used to prepare a negative electrode electrolyte with a narrow application area. Although the industrial high-purity $V_2O_3$ used in the patent has a total vanadium content of 67% (corresponding to a purity of 98.5%), it still contains many impurity ions. Chinese patent CN102468509A discloses a method for preparing a vanadium battery electrolyte, which comprises: preparing $V_2O_3$ by segmented calcination at 200-300° C. and 600-700° C. with ammonium metavanadate and ammonium bicarbonate as raw materials, dissolving $V_2O_3$ in a dilute sulfuric acid and reacting for 5-20 hours at 50-120° C. to obtain a $V_2(SO_4)3$ solution, and dissolving $V_2O_5$ in the $V_2(SO_4)3$ solution and reacting for 1-3 hours at 80-110° C. to obtain a vanadium battery electrolyte with an average vanadium ion valence of 3.5. The $V_2(SO_4)_3$ solution is prepared as the negative electrode electrolyte in this patent. The main problem of the method lies in the long-time dissolution operation at a higher temperature (at which temperature the V(III) vanadium ion hydrate is prone to form an oxygen-bridge bond, leading to the production of polycondensation and thus a decreased electrolyte activity), and lack of an activation step; and the purity of the electrolyte is not high. Chinese patent CN103401010A discloses a method for preparing an all-vanadium redox flow battery electrolyte, which comprises: reducing $V_2O_5$ powder in hydrogen to prepare $V_2O_4$ powder and $V_2O_3$ powder, dissolving $V_2O_4$ and $V_2O_3$ in the concentrated sulfuric acid respectively to obtain the positive and negative electrode electrolytes of the vanadium battery. The main problem of the patent lies in that no specific reduction process is provided. The $V_2O_4$ powder is prepared by reducing $V_2O_5$ in hydrogen, however, in the process, over-reduction or under-reduction is prone to occur and the process only can be achieved by precise control, but the patent does not provide measures about the precise control of reduction. In addition, the purity is low. Chinese patents CN101880059A and CN102557134A disclose a fluidized reduction furnace and reduction method for producing high-purity vanadium trioxide, wherein a heat transfer internal member is added in a fluidized bed to achieve the enhanced heat transfer; and cyclone preheating is used to increase the energy utilization rate and realize the efficient preparation of $V_2O_3$. However, since the systems do not have the function of precise control of reduction, the methods described in these two patents are only suitable for the preparation of $V_2O_3$ and not suitable for the preparation of other low-valence vanadium oxides.

In summary, there is an urgent need in the art to solve the disadvantages of the process and technology for preparation of the all-vanadium redox flow battery electrolyte, so as to simplify the preparation process, increase the purity and activity of the electrolyte, and improve the simplicity of electrolyte preparation and use.

SUMMARY

In view of the above problems, the present invention proposes a system and method for preparing a high-purity vanadium electrolyte, to simplify the preparation process, increase the purity of the electrolyte, improve the simplicity of electrolyte preparation, and facilitate the transportation. In order to achieve these objectives, the present invention adopts the following technical solutions.

Figure 1:
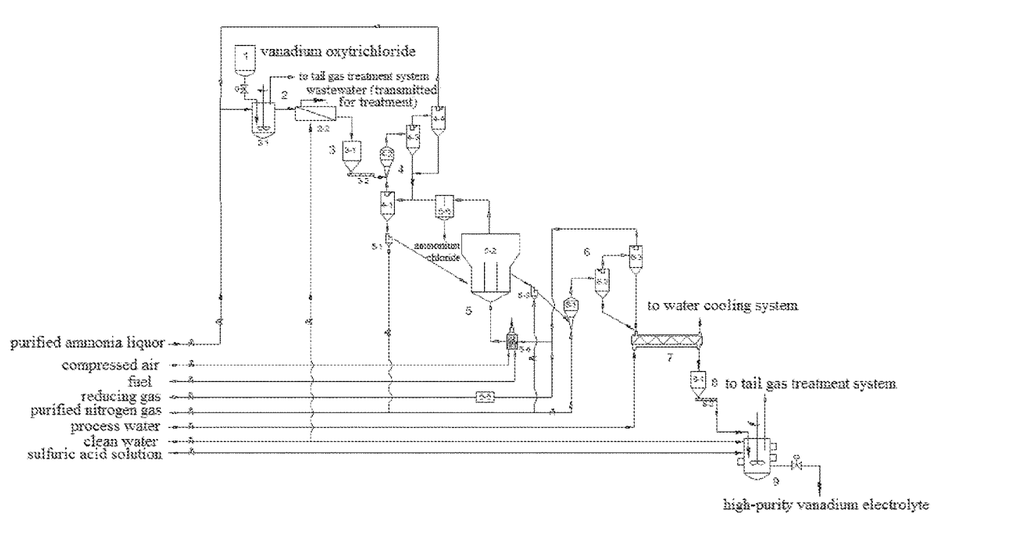
FIG. 1 is a schematic diagram illustrating the configuration of a system for preparing a high-purity vanadium electrolyte according to the present invention.

The present invention provides a system for preparing a high-purity vanadium electrolyte, comprising: a vanadium oxytrichloride storage tank 1, an ammonium salt precipitating device 2, an ammonium salt feeding device 3, a preheating system 4, a reduction fluidized bed 5, a cooling system 6, a secondary cooling device 7, a low-valence vanadium oxide feeding device 8, and a dissolution and activation reactor 9;

wherein the ammonium salt precipitating device 2 comprises an ammonium salt precipitating reaction tank 2-1 and a washing filter 2-2;

the ammonium salt feeding device 3 comprises an ammonium salt hopper 3-1 and an ammonium salt screw feeder 3-2;

the preheating system 4 comprises a primary cyclone preheater 4-1, a venturi preheater 4-2, a secondary cyclone preheater 4-3, and a first cyclone separator 4-4;

the reduction fluidized bed 5 comprises a feeder 5-1, a bed body 5-2, a discharger 5-3, a gas heater 5-4, a gas purifier 5-5, and an ammonium chloride settling tower 5-6;

the cooling system 6 comprises a venturi cooler 6-1, a cyclone cooler 6-2, and a second cyclone separator 6-3;

the low-valence vanadium oxide feeding device 8 comprises a low-valence vanadium oxide hopper 8-1 and a low-valence vanadium oxide screw feeder 8-2;

wherein a feed outlet at the bottom of the vanadium oxytrichloride storage tank 1 is connected with a chloride inlet of the ammonium salt precipitating reaction tank 2-1 through a pipeline; an ammonia solution inlet of the ammonium salt precipitating reaction tank 2-1 is connected with a purified ammonia liquor main pipe and a gas outlet of the first cyclone separator 4-4 through pipelines; a flue gas outlet of the ammonium salt precipitating reaction tank 2-1 is connected with a tail gas treatment system through a pipeline; a slurry outlet of the ammonium salt precipitating reaction tank 2-1 is connected with a slurry inlet of the washing filter 2-2 through a pipeline; a clean water inlet of the washing filter 2-2 is connected with a clean water main pipe through a pipeline; a washing liquid outlet of the washing filter 2-2 is connected with a wastewater treatment unit through a pipeline; and a solid material outlet of the washing filter 2-2 is connected with a feed inlet of the ammonium salt hopper 3-1 through a pipeline;

a feed outlet at the bottom of the ammonium salt hopper 3-1 is connected with a feed inlet of the ammonium salt screw feeder 3-2; and a feed outlet of the ammonium salt screw feeder 3-2 is connected with a feed inlet of the venturi preheater 4-2 through a pipeline;

a gas inlet of the venturi preheater 4-2 is connected with a gas outlet of the primary cyclone preheater 4-1 through a pipeline; a feed outlet of the venturi preheater 4-2 is connected with a gas inlet of the secondary cyclone preheater 4-3 through a pipeline; a gas outlet of the secondary cyclone preheater 4-3 is connected with a gas inlet of the first cyclone separator 4-4 through a pipeline; a feed outlet of the secondary cyclone cooler 4-3 is connected with a gas inlet of the primary cyclone cooler 4-1 through a pipeline; a gas outlet of the first cyclone separator 4-4 is connected with the ammonia solution inlet of the ammonium salt precipitating reaction tank 2-1 through a pipeline; a feed outlet of the first cyclone separator 4-4 is connected with the gas inlet of the primary cyclone preheater 4-1 through a pipeline; the gas inlet of the primary cyclone preheater 4-1 is connected with a gas outlet of the ammonium chloride settling tower 5-6 through a pipeline; a feed outlet of the primary cyclone preheater 4-1 is connected with a feed inlet of the feeder 5-1 through a pipeline; a feed outlet of the feeder 5-1 is connected with a feed inlet of the bed body 5-2 through a pipeline; an aeration air inlet of the feeder 5-1 is connected with a purified nitrogen gas main pipe through a pipeline; a high-temperature flue gas outlet of the bed body 5-2 is connected with a gas inlet of the ammonium chloride settling tower 5-6 through a pipeline; the gas outlet of the ammonium chloride settling tower 5-6 is connected with the gas inlet of the primary cyclone preheater 4-1 through a pipeline; a gas inlet of the bed body 5-2 is connected with a gas outlet of the gas heater 5-4 through a pipeline; a gas inlet of the gas heater 5-4 is connected with gas outlets of the second cyclone separator 6-3 and the gas purifier 5-5 through pipelines, respectively; a combustion air inlet of the gas heater 5-4 is connected with a compressed air main pipe; a fuel inlet of the gas heater 5-4 is connected with a fuel main pipe; and a gas inlet of the gas purifier 5-5 is connected with a reducing gas main pipe;

a gas inlet of the venturi cooler 6-1 is connected with the purified nitrogen gas main pipe; a gas outlet of the venturi cooler 6-1 is connected with a gas inlet of the cyclone cooler 6-2 through a pipeline; a gas outlet of the cyclone cooler 6-2 is connected with a gas inlet of the second cyclone separator 6-3 through a pipeline; a feed outlet of the cyclone cooler 6-2 is connected with a feed inlet of the secondary cooling device 7 through a pipeline; a gas outlet of the second cyclone separator 6-3 is connected with the gas inlet of the gas heater 5-4 through a pipeline; and a feed outlet of the second cyclone separator 6-3 is connected with the feed inlet of the secondary cooling device 7 through a pipeline;

a feed outlet of the secondary cooling device 7 is connected with a feed inlet of the low-valence vanadium oxide hopper 8-1 through a pipeline; a process water inlet of the secondary cooling device 7 is connected with a process water main pipe; and a process water outlet of the secondary cooling device 7 is connected with a water cooling system;

a feed outlet at the bottom of the low-valence vanadium oxide hopper 8-1 is connected with a feed inlet of the low-valence vanadium oxide screw feeder 8-2; and a feed outlet of the low-valence vanadium oxide screw feeder 8-2 is connected with a feed inlet of the dissolution and activation reactor 9 through a pipeline;

a clean water inlet of the dissolution and activation reactor 9 is connected with the clean water main pipe; a sulfuric acid solution inlet of the dissolution and activation reactor 9 is connected with a sulfuric acid solution main pipe; and a gas outlet of the dissolution and activation reactor 9 is connected with the tail gas treatment system.

The present invention further provides a method for preparing a high-purity vanadium electrolyte based on the above system, which comprises the following steps:

allowing vanadium oxytrichloride liquid from the vanadium oxytrichloride storage tank 1 to enter the ammonium salt precipitating reaction tank 2-1 through a pipeline, and undergo hydrolysis precipitation together with ammonia liquor from the purified ammonia liquor main pipe and ammonia-rich tail gas from the reduction fluidized bed 5 to form a mixed slurry of ammonium salt precipitate containing ammonium polyvanadate and ammonium metavanadate with an ammonium chloride solution; transmitting the generated flue gas to the tail gas treatment system; allowing the slurry to enter the washing filter 2-2 and be subjected to washing with clean water and filtration, to obtain washing liquid and ammonium salt precipitate powder; transmitting the washing liquid into the wastewater treatment system; and transmitting the ammonium salt precipitate into the ammonium salt hopper 3-1;

allowing the ammonium salt precipitate in the ammonium salt hopper 3-1 to enter the ammonium salt screw feeder 3-2, the venturi preheater 4-2, the secondary cyclone preheater 4-3, and the primary cyclone preheater 4-1 in turn, and enter the bed body 5-2 through the feeder 5-1 together with the fine powder recovered by the first cyclone separator 4-4; allowing purified nitrogen gas from the purified nitrogen gas main pipe to enter the venturi cooler 6-1, the cyclone cooler 6-2 and the second cyclone separator 6-3 in turn, and be merged with purified reducing gas from the gas purifier 5-4, and then be transmitted into the bed body 5-2, such that the ammonium salt precipitate powder material is kept at a fluidized state and reduced to obtain low-valence vanadium oxide powder and ammonia-rich reduction flue gas; allowing the ammonia-rich reduction flue gas to settle through the ammonium chloride settling tower 5-6, and then enter the primary cyclone preheater 4-1, the venturi preheater 4-2, and the secondary cyclone preheater 4-3 in turn, and be subjected to dust removing by the first cyclone separator 4-4, and then be mixed with ammonia liquor from the purified ammonia liquor main pipe, and be transmitted into the ammonium salt precipitating reaction tank 2-1; allowing the low-valence vanadium oxide to enter the venturi cooler 6-1 and the cyclone cooler 6-2 in turn through the discharger 5-3, and enter the dissolution and activation reactor 9 through the secondary cooling device 7, the low-valence vanadium oxide hopper 8-1 and the low-valence vanadium oxide screw feeder 8-2 together with the fine powder recovered by the second cyclone separator 6-3, and undergo dissolution reaction together with clean water from the clean water main pipe and a sulfuric acid solution from the sulfuric acid solution main pipe under ultrasonic field to obtain the high-purity vanadium electrolyte, wherein the generated acid mist gas is transmitted into the tail gas treatment system.

The first characteristic of the present invention lies in that: the raw material of vanadium oxytrichloride has a purity of 99%-99.9999%, i.e., 2N-6N.

The second characteristic of the present invention lies in that: in the ammonium salt precipitating reaction tank 2-1, the mass ratio of the purified ammonia liquor to vanadium oxytrichloride is 0.5-20, the concentration of the ammonia liquor is 15 mol/L, and the operation temperature is 30-90° C.

The third characteristic of the present invention lies in that: the ammonium salt in the ammonium salt hopper 3-1 is one or more of ammonium metavanadate, ammonium polyvanadate, and ammonium chloride.

The fourth characteristic of the present invention lies in that: the reducing gas introduced into the reducing gas purifier 5-5 is hydrogen gas or coal gas.

The fifth characteristic of the present invention lies in that: in the reduction fluidized bed body 5-2, the operation temperature is 400-700° C. in the reduction, and after the reducing gas is purified by the gas purifier 5-5, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 30-90 min.

The sixth characteristic of the present invention lies in that: the high-purity vanadium electrolyte is a mixed electrolyte with the molar concentration ratio of vanadium ions V(III) to V(IV) of 1:1, and the average valence of the vanadium ions is 3.5, and the vanadium electrolyte can be directly used in a new all-vanadium redox flow battery stack.

The seventh characteristic of the present invention lies in that: the sulfuric acid solution is of electronic-grade purity and has a molar concentration of 4.0-10.0 mol/L.

The eighth characteristic of the present invention lies in that: in the dissolution and activation reactor 9, ultrasound is used to promote dissolution of the low-valence vanadium oxide and activate the vanadium ions, and the dissolution and activation time is 30-300 minutes, the dissolution and activation temperature is 20-45° C., the power density is 10-300 W/L, and the frequency is 28 KHz, 40 KHz or 60 KHz.

The electrolyte produced by the present invention is of high purity, high activity and simple assembly. The present invention has the following outstanding advantages:

(1) High purity: vanadium oxytrichloride which is easy to be highly purified is used as a raw material, and it is easy to obtain high-purity vanadium oxytrichloride with a purity of 2N-6N. Taking 5N vanadium oxytrichloride for example, a low-valence vanadium oxide with a purity of 4N5 (i.e., a purity of 99.995%) can be prepared by the present invention, and therefore a high-purity vanadium electrolyte can be formulated. In addition to the effective components, the total impurity content is lower than 5 ppm.

(2) Direct ammonium salt precipitation: the process is mature and convenient for industrial application.

(3) Realizing the sensible heat utilization of the high-temperature tail gas and high-temperature reduction product in the fluidized bed: the high-temperature tail gas discharged from the reduction fluidized bed is in direct contact with the cold vanadium-containing material, such that the cold vanadium-containing material is heated while the sensible heat of the high-temperature reduction tail gas is recovered; the purified nitrogen gas for reduction is in direct contact with the discharged high-temperature low-valence vanadium oxide product, such that the purified nitrogen gas is preheated while the reduction product is cooled to recover the sensible heat of the high-temperature reduction product.

(4) Achieving recycling of ammonia-rich tail gas from the reduction fluidized bed: the high-temperature ammonia-rich tail gas produced in the reduction fluidized bed is transmitted into the ammonium salt precipitating reaction tank through a pipeline to realize the recycling of ammonia gas.

(5) Precise control of reduction: a rectangular multi-bin fluidized bed is used to achieve precise control over reduction of the valence state.

(6) High activity: ultrasound is used to assist the dissolution of the low-valence vanadium oxide and activate the vanadium ions, so as to implement the preparation of the vanadium electrolyte in a low temperature range of 20-45° C., which significantly improves the activity of the electrolyte.

(7) Convenient transportation: the process for producing the electrolyte is short, and suitable for on-site configuration of vanadium batteries, and the low-valence vanadium oxide can be transported, thereby greatly reducing the transportation cost.

(8) 3.5-valence electrolyte: the electrolyte is suitable for configuration of a new vanadium battery stack, and can be directly added to positive and negative electrode chambers for use, which is simple to operate.

The present invention has the advantages of low energy consumption in production and low operation cost, high product purity, stable quality, simple electrolyte preparation and assembly and so on, and is suitable for the large-scale industrial production of the all-vanadium redox flow battery electrolyte, with good economic and social benefits.

BRIEF DESCRIPTION OF THE DRAWINGS

The accompanying drawing is used to provide further illustration of the present invention and constitutes a part of the specification. It is used to explain the present invention together with the examples of the present invention, rather than limit the present invention.

DETAILED DESCRIPTION OF THE EMBODIMENTS

In order to make the object, technical solution, and advantages of the present invention be clearer, the technical solution in the examples of the present invention will be described clearly and completely below with reference to the accompanying drawing of the examples of the present invention. Obviously, the described examples are only a part of the examples of the present invention, not all examples. It is worth noting that the examples are merely used for illustrating the technical solution of the present invention, rather than limiting the present invention. FIG. 1 is a schematic diagram of a system and method for preparing a high-purity vanadium electrolyte according to the present invention.

FIG. 1 includes the following designators:
1 Vanadium oxytrichloride storage tank
2 Ammonium salt precipitating device
2-1 Ammonium salt precipitating reaction tank
2-2 Washing filter
3 Ammonium salt feeding device
3-1 Ammonium salt hopper
3-2 Ammonium salt screw feeder
4 Preheating system
4-1 Primary cyclone preheater
4-2 Venturi preheater
4-3 Secondary cyclone preheater
4-4 First cyclone separator
5 Reduction fluidized bed
5-1 Feeder
5-2 Bed body
5-3 Discharger
5-4 Gas heater
5-5 Gas purifier
5-6 Ammonium chloride settling tower
6 Cooling system
6-1 Venturi cooler
6-2 Cyclone cooler
6-3 Second cyclone separator
7 Secondary cooling device
8 Low-valence vanadium oxide feeding device
8-1 Low-valence vanadium oxide hopper
8-2 Low-valence vanadium oxide screw feeder
9 Dissolution and activation reactor

Example 1

With reference to FIG. 1, the system for preparing a high-purity vanadium electrolyte used in this example comprises a vanadium oxytrichloride storage tank 1, an ammonium salt precipitating device 2, an ammonium salt feeding device 3, a preheating system 4, a reduction fluidized bed 5, a cooling system 6, a secondary cooling device 7, a low-valence vanadium oxide feeding device 8, and a dissolution and activation reactor 9.

The ammonium salt precipitating device 2 comprises an ammonium salt precipitating reaction tank 2-1 and a washing filter 2-2.

The ammonium salt feeding device 3 comprises an ammonium salt hopper 3-1 and an ammonium salt screw feeder 3-2.

The preheating system 4 comprises a primary cyclone preheater 4-1, a venturi preheater 4-2, a secondary cyclone preheater 4-3, and a first cyclone separator 4-4.

The reduction fluidized bed 5 comprises a feeder 5-1, a bed body 5-2, a discharger 5-3, a gas heater 5-4, a gas purifier 5-5, and an ammonium chloride settling tower 5-6.

The cooling system 6 comprises a venturi cooler 6-1, a cyclone cooler 6-2, and a second cyclone separator 6-3.

The low-valence vanadium oxide feeding device 8 comprises a low-valence vanadium oxide hopper 8-1 and a low-valence vanadium oxide screw feeder 8-2.

A feed outlet at the bottom of the vanadium oxytrichloride storage tank 1 is connected with a chloride inlet of the ammonium salt precipitating reaction tank 2-1 through a pipeline; an ammonia solution inlet of the ammonium salt precipitating reaction tank 2-1 is connected with a purified ammonia liquor main pipe and a gas outlet of the first cyclone separator 4-4 through pipelines; a flue gas outlet of the ammonium salt precipitating reaction tank 2-1 is connected with a tail gas treatment system through a pipeline; a slurry outlet of the ammonium salt precipitating reaction tank 2-1 is connected with a slurry inlet of the washing filter 2-2 through a pipeline; a clean water inlet of the washing filter 2-2 is connected with a clean water main pipe through a pipeline; a washing liquid outlet of the washing filter 2-2 is connected with a wastewater treatment unit through a pipeline; and a solid material outlet of the washing filter 2-2 is connected with a feed inlet of the ammonium salt hopper 3-1 through a pipeline.

A feed outlet at the bottom of the ammonium salt hopper 3-1 is connected with a feed inlet of the ammonium salt screw feeder 3-2; and a feed outlet of the ammonium salt screw feeder 3-2 is connected with a feed inlet of the venturi preheater 4-2 through a pipeline.

A gas inlet of the venturi preheater 4-2 is connected with a gas outlet of the primary cyclone preheater 4-1 through a pipeline; a feed outlet of the venturi preheater 4-2 is connected with a gas inlet of the secondary cyclone preheater 4-3 through a pipeline; a gas outlet of the secondary cyclone preheater 4-3 is connected with a gas inlet of the first cyclone separator 4-4 through a pipeline; a feed outlet of the secondary cyclone cooler 4-3 is connected with a gas inlet of the primary cyclone cooler 4-1 through a pipeline; a gas outlet of the first cyclone separator 4-4 is connected with the ammonia solution inlet of the ammonium salt precipitating reaction tank 2-1 through a pipeline; a feed outlet of the first cyclone separator 4-4 is connected with the gas inlet of the primary cyclone preheater 4-1 through a pipeline; the gas inlet of the primary cyclone preheater 4-1 is connected with a gas outlet of the ammonium chloride settling tower 5-6 through a pipeline; a feed outlet of the primary cyclone preheater 4-1 is connected with a feed inlet of the feeder 5-1 through a pipeline; a feed outlet of the feeder 5-1 is connected with a feed inlet of the bed body 5-2 through a pipeline; an aeration air inlet of the feeder 5-1 is connected with a purified nitrogen gas main pipe through a pipeline; a high-temperature flue gas outlet of the bed body 5-2 is connected with a gas inlet of the ammonium chloride settling tower 5-6 through a pipeline; the gas outlet of the ammonium chloride settling tower 5-6 is connected with the gas inlet of the primary cyclone preheater 4-1 through a pipeline; a gas inlet of the bed body 5-2 is connected with a gas outlet of the gas heater 5-4 through a pipeline; a gas inlet of the gas heater 5-4 is connected with gas outlets of the second cyclone separator 6-3 and the gas purifier 5-5 through pipelines, respectively; a combustion air inlet of the gas heater 5-4 is connected with a compressed air main pipe; a fuel inlet of the gas heater 5-4 is connected with a fuel main pipe; and a gas inlet of the gas purifier 5-5 is connected with a reducing gas main pipe.

A gas inlet of the venturi cooler 6-1 is connected with the purified nitrogen gas main pipe; a gas outlet of the venturi cooler 6-1 is connected with a gas inlet of the cyclone cooler 6-2 through a pipeline; a gas outlet of the cyclone cooler 6-2 is connected with a gas inlet of the second cyclone separator 6-3 through a pipeline; a feed outlet of the cyclone cooler 6-2 is connected with a feed inlet of the secondary cooling device 7 through a pipeline; a gas outlet of the second cyclone separator 6-3 is connected with the gas inlet of the gas heater 5-4 through a pipeline; and a feed outlet of the second cyclone separator 6-3 is connected with the feed inlet of the secondary cooling device 7 through a pipeline.

A feed outlet of the secondary cooling device 7 is connected with a feed inlet of the low-valence vanadium oxide hopper 8-1 through a pipeline; a process water inlet of the secondary cooling device 7 is connected with a process water main pipe; and a process water outlet of the secondary cooling device 7 is connected with a water cooling system.

A feed outlet at the bottom of the low-valence vanadium oxide hopper 8-1 is connected with a feed inlet of the low-valence vanadium oxide screw feeder 8-2; and a feed outlet of the low-valence vanadium oxide screw feeder 8-2 is connected with a feed inlet of the dissolution and activation reactor 9 through a pipeline.

A clean water inlet of the dissolution and activation reactor 9 is connected with the clean water main pipe; a sulfuric acid solution inlet of the dissolution and activation reactor 9 is connected with a sulfuric acid solution main pipe; and a gas outlet of the dissolution and activation reactor 9 is connected with the tail gas treatment system.

Example 2

The above system is used in this example to prepare a high-purity vanadium electrolyte. The method specifically comprises the following steps.

Vanadium oxytrichloride liquid from the vanadium oxytrichloride storage tank 1 enters the ammonium salt precipitating reaction tank 2-1 through a pipeline, and undergoes hydrolysis precipitation together with ammonia liquor from the purified ammonia liquor main pipe and ammonia-rich tail gas from the reduction fluidized bed 5 to form a mixed slurry of ammonium salt precipitate containing ammonium polyvanadate and ammonium metavanadate with an ammonium chloride solution. The generated flue gas is transmitted to the tail gas treatment system. The slurry enters the washing filter 2-2 and is subjected to washing with clean water and filtration, to obtain washing liquid and ammonium salt precipitate powder. The washing liquid is transmitted into the wastewater treatment system. The ammonium salt precipitate is transmitted into the ammonium salt hopper 3-1.

The ammonium salt precipitate in the ammonium salt hopper 3-1 enters the ammonium salt screw feeder 3-2, the venturi preheater 4-2, the secondary cyclone preheater 4-3, and the primary cyclone preheater 4-1 in turn, and enters the bed body 5-2 through the feeder 5-1 together with the fine powder recovered by the first cyclone separator 4-4. Purified nitrogen gas from the purified nitrogen gas main pipe enters the venturi cooler 6-1, the cyclone cooler 6-2 and the second cyclone separator 6-3 in turn, and is merged with purified reducing gas from the gas purifier 5-4, and then is transmitted into the bed body 5-2, such that the ammonium salt precipitate powder material is kept at a fluidized state and reduced to obtain low-valence vanadium oxide powder and ammonia-rich reduction flue gas. The ammonia-rich reduction flue gas is settled through the ammonium chloride settling tower 5-6, and then enters the primary cyclone preheater 4-1, the venturi preheater 4-2, and the secondary cyclone preheater 4-3 in turn, and is subjected to dust removing by the first cyclone separator 4-4, and then is mixed with ammonia liquor from the purified ammonia liquor main pipe, and is transmitted into the ammonium salt precipitating reaction tank 2-1. The low-valence vanadium oxide enters the venturi cooler 6-1 and the cyclone cooler 6-2 in turn through the discharger 5-3, and enters the dissolution and activation reactor 9 through the secondary cooling device 7, the low-valence vanadium oxide hopper 8-1 and the low-valence vanadium oxide screw feeder 8-2 together with the fine powder recovered by the second cyclone separator 6-3, and undergoes dissolution reaction together with clean water from the clean water main pipe and a sulfuric acid solution from the sulfuric acid solution main pipe under ultrasonic field to obtain the high-purity vanadium electrolyte, wherein the generated acid mist gas is transmitted into the tail gas treatment system.

Example 3

In this example, vanadium oxytrichloride (with a purity of above 2N) was used as a raw material, and the throughput was 3 kg/h. In the ammonium salt precipitating reaction tank 2-1, Purified ammonia liquor and vanadium oxytrichloride were added in a mass ratio of 0.5, and the operation temperature was set to be 90° C., to obtain a mixed slurry of an ammonium salt precipitate containing ammonium polyvanadate and ammonium metavanadate with an ammonium chloride solution. The slurry entered the washing filter 2-2 to be subjected to washing with clean water and filtration, to obtain washing liquid and ammonium salt precipitate powder, wherein the washing liquid was transmitted to the wastewater treatment system, and the ammonium salt precipitate was preheated by the preheating system and then entered the reduction fluidized bed. In the reduction fluidized bed 5, the reducing gas introduced was coal gas, the volume fraction of coal gas in the mixed gas of the nitrogen gas and coal gas introduced into the reduction fluidized bed 5 was 10%, the average residence time of the powder was 90 min, and the operation temperature was 400° C., and a low-valence vanadium oxide having an average vanadium valence of 3.5 and a purity of 98.5% was obtained. In the dissolution and activation reactor, an electronic-grade sulfuric acid solution (4.0 mol/L) and clean water (having a resistivity of 15.0 MΩ·cm) were added, and the dissolving temperature was 20° C., and activation was conducted for 300 minutes with an ultrasonic power density of 10 W/L and a frequency of 28 KHz, to obtain a vanadium electrolyte with a total impurity content of less than 0.5% (except for the effective components).

Example 4

In this example, vanadium oxytrichloride (with a purity of above 3N) was used as a raw material, and the throughput was 30 kg/h. In the ammonium salt precipitating reaction tank 2-1, Purified ammonia liquor and vanadium oxytrichloride were added in a mass ratio of 20, and the operation temperature was set to be 30° C., to obtain a mixed slurry of an ammonium salt precipitate containing ammonium polyvanadate and ammonium metavanadate with an ammonium chloride solution. The slurry entered the washing filter 2-2 to be subjected to washing with clean water and filtration, to obtain washing liquid and ammonium salt precipitate powder, wherein the washing liquid was transmitted to the wastewater treatment system, and the ammonium salt precipitate was preheated by the preheating system and then entered the reduction fluidized bed. In the reduction fluidized bed 5, the reducing gas introduced was coal gas, the volume fraction of coal gas in the mixed gas of the nitrogen gas and coal gas introduced into the reduction fluidized bed 5 was 90%, the average residence time of the powder was 30 min, and the operation temperature was 700° C., and a low-valence vanadium oxide having an average vanadium valence of 3.5 and a purity of 99.85% was obtained. In the dissolution and activation reactor, an electronic-grade sulfuric acid solution (10.0 mol/L) and clean water (having a resistivity of 18.0 MΩ·cm) were added, and the dissolving temperature was 45° C., and activation was conducted for 30 minutes with an ultrasonic power density of 300 W/L and a frequency of 40 KHz, to obtain a high-purity vanadium electrolyte with a total impurity content of less than 0.02% (except for the effective components).

Example 5

In this example, vanadium oxytrichloride (with a purity of above 4N) was used as a raw material, and the throughput was 300 kg/h. In the ammonium salt precipitating reaction tank 2-1, Purified ammonia liquor and vanadium oxytrichloride were added in a mass ratio of 10, and the operation temperature was set to be 60° C., to obtain a mixed slurry of an ammonium salt precipitate containing ammonium polyvanadate and ammonium metavanadate with an ammonium chloride solution. The slurry entered the washing filter 2-2 to be subjected to washing with clean water and filtration, to obtain washing liquid and ammonium salt precipitate powder, wherein the washing liquid was transmitted to the wastewater treatment system, and the ammonium salt precipitate was preheated by the preheating system and then entered the reduction fluidized bed. In the reduction fluidized bed 5, the reducing gas introduced was hydrogen gas, the volume fraction of hydrogen gas in the mixed gas of the nitrogen gas and hydrogen gas introduced into the reduction fluidized bed 5 was 70%, the average residence time of the powder was 60 min, and the operation temperature was 600° C., and a low-valence vanadium oxide having an average vanadium valence of 3.5 and a purity of 99.97% was obtained. In the dissolution and activation reactor, an electronic-grade sulfuric acid solution (8.0 mol/L) and clean water (having a resistivity of 18.0 MΩ·cm) were added, and the dissolving temperature was 35° C., and activation was conducted for 200 minutes with an ultrasonic power density of 200 W/L and a frequency of 60 KHz, to obtain a high-purity vanadium electrolyte with a total impurity content of less than 0.005% (except for the effective components).

Example 6

In this example, vanadium oxytrichloride (with a purity of above 5N) was used as a raw material, and the throughput was 3000 kg/h. In the ammonium salt precipitating reaction tank 2-1, Purified ammonia liquor and vanadium oxytrichloride were added in a mass ratio of 5, and the operation temperature was set to be 50° C., to obtain a mixed slurry of an ammonium salt precipitate containing ammonium polyvanadate and ammonium metavanadate with an ammonium chloride solution. The slurry entered the washing filter 2-2 to be subjected to washing with clean water and filtration, to obtain washing liquid and ammonium salt precipitate powder, wherein the washing liquid was transmitted to the wastewater treatment system, and the ammonium salt precipitate was preheated by the preheating system and then entered the reduction fluidized bed. In the reduction fluidized bed 5, the reducing gas introduced was hydrogen gas, the volume fraction of hydrogen gas in the mixed gas of the nitrogen gas and hydrogen gas introduced into the reduction fluidized bed 5 was 50%, the average residence time of the powder was 45 min, and the operation temperature was 550° C., and a low-valence vanadium oxide having an average vanadium valence of 3.5 and a purity of 99.997% was obtained. In the dissolution and activation reactor, an electronic-grade sulfuric acid solution (5.0 mol/L) and clean water (having a resistivity of 18.0 MΩ·cm) were added, and the dissolving temperature was 30° C., and activation was conducted for 100 minutes with an ultrasonic power density of 100 W/L and a frequency of 60 KHz, to obtain a high-purity vanadium electrolyte with a total impurity content of less than 5 ppm (except for the effective components).

Example 7

In this example, vanadium oxytrichloride (with a purity of above 6N) was used as a raw material, and the throughput was 3000 kg/h. In the ammonium salt precipitating reaction tank 2-1, Purified ammonia liquor and vanadium oxytrichloride were added in a mass ratio of 5, and the operation temperature was set to be 50° C., to obtain a mixed slurry of an ammonium salt precipitate containing ammonium polyvanadate and ammonium metavanadate with an ammonium chloride solution. The slurry entered the washing filter 2-2 to be subjected to washing with clean water and filtration, to obtain washing liquid and ammonium salt precipitate powder, wherein the washing liquid was transmitted to the wastewater treatment system, and the ammonium salt precipitate was preheated by the preheating system and then entered the reduction fluidized bed. In the reduction fluidized bed 5, the reducing gas introduced was hydrogen gas, the volume fraction of hydrogen gas in the mixed gas of the nitrogen gas and hydrogen gas introduced into the reduction fluidized bed 5 was 50%, the average residence time of the powder was 45 min, and the operation temperature was 550° C., and a low-valence vanadium oxide having an average vanadium valence of 3.5 and a purity of 5N5 (i.e., a purity of 99.9995%) was obtained. In the dissolution and activation reactor, an electronic-grade sulfuric acid solution (5.0 mol/L) and clean water (having a resistivity of 18.0 MΩ·cm) were added, and the dissolving temperature was 30° C., and activation was conducted for 100 minutes with an ultrasonic power density of 100 W/L and a frequency of 60 KHz, to obtain a high-purity vanadium electrolyte with a total impurity content of less than 1 ppm (except for the effective components).

The contents which are not illustrated in detail in the present invention belong to the well-known technologies in the art.

Of course, the present invention can also provide a variety of examples. According to the disclosure of the present invention, those skilled in the art can make various corresponding changes and transformations without departing from the spirit and essence of the present invention. However, these corresponding changes and transformations shall all fall within the protection scope of the claims of the present invention.

What is claimed is:

1. A system for preparing a high-purity vanadium electrolyte, comprising: a vanadium oxytrichloride storage tank, an ammonium salt precipitating device, an ammonium salt feeding device, a preheating system, a reduction fluidized bed, a cooling system, a secondary cooling device, a low-valence vanadium oxide feeding device, and a dissolution and activation reactor;

wherein the ammonium salt precipitating device comprises an ammonium salt precipitating reaction tank and a washing filter;

the ammonium salt feeding device comprises an ammonium salt hopper and an ammonium salt screw feeder;

the preheating system comprises a primary cyclone preheater, a venturi preheater, a secondary cyclone preheater, and a first cyclone separator;

the reduction fluidized bed comprises a feeder, a bed body, a discharger, a gas heater, a gas purifier, and an ammonium chloride settling tower;

the cooling system comprises a venturi cooler, a cyclone cooler, and a second cyclone separator;

the low-valence vanadium oxide feeding device comprises a low-valence vanadium oxide hopper and a low-valence vanadium oxide screw feeder;

wherein a feed outlet at the bottom of the vanadium oxytrichloride storage tank is connected with a chloride inlet of the ammonium salt precipitating reaction tank through a pipeline; an ammonia solution inlet of the ammonium salt precipitating reaction tank is connected with a purified ammonia liquor main pipe and a gas outlet of the first cyclone separator through pipelines; a flue gas outlet of the ammonium salt precipitating reaction tank is connected with a tail gas treatment system through a pipeline; a slurry outlet of the ammonium salt precipitating reaction tank is connected with a slurry inlet of the washing filter through a pipeline; a clean water inlet of the washing filter is connected with a clean water main pipe through a pipeline; a washing liquid outlet of the washing filter is connected with a wastewater treatment unit through a pipeline; and a solid material outlet of the washing filter is connected with a feed inlet of the ammonium salt hopper through a pipeline;

a feed outlet at the bottom of the ammonium salt hopper is connected with a feed inlet of the ammonium salt screw feeder; and a feed outlet of the ammonium salt screw feeder is connected with a feed inlet of the venturi preheater through a pipeline;

a gas inlet of the venturi preheater is connected with a gas outlet of the primary cyclone preheater through a pipeline; a feed outlet of the venturi preheater is connected with a gas inlet of the secondary cyclone preheater through a pipeline; a gas outlet of the secondary cyclone preheater is connected with a gas inlet of the first cyclone separator through a pipeline; a feed outlet of the secondary cyclone heater is connected with a gas inlet of the primary cyclone heater through a pipeline; a gas outlet of the first cyclone separator is connected with the ammonia solution inlet of the ammonium salt precipitating reaction tank through a pipeline; a feed outlet of the first cyclone separator is connected with the gas inlet of the primary cyclone preheater through a pipeline; the gas inlet of the primary cyclone preheater is connected with a gas outlet of the ammonium chloride settling tower through a pipeline; a feed outlet of the primary cyclone preheater is connected with a feed inlet of the feeder through a pipeline; a feed outlet of the feeder is connected with a feed inlet of the bed body through a pipeline; an aeration air inlet of the feeder is connected with a purified nitrogen gas main pipe through a pipeline; a high-temperature flue gas outlet of the bed body is connected with a gas inlet of the ammonium chloride settling tower through a pipeline; the gas outlet of the ammonium chloride settling tower is connected with the gas inlet of the primary cyclone preheater through a pipeline; a gas inlet of the bed body is connected with a gas outlet of the gas heater through a pipeline; a gas inlet of the gas heater is connected with gas outlets of the second cyclone separator and the gas purifier through pipelines, respectively; a combustion air inlet of the gas heater is connected with a compressed air main pipe; a fuel inlet of the gas heater is connected with a fuel main pipe; and a gas inlet of the gas purifier is connected with a reducing gas main pipe;

a gas inlet of the venturi cooler is connected with the purified nitrogen gas main pipe; a gas outlet of the venturi cooler is connected with a gas inlet of the cyclone cooler through a pipeline; a gas outlet of the cyclone cooler is connected with a gas inlet of the second cyclone separator through a pipeline; a feed outlet of the cyclone cooler is connected with a feed inlet of the secondary cooling device through a pipeline; a gas outlet of the second cyclone separator is connected with the gas inlet of the gas heater through a pipeline; and a feed outlet of the second cyclone separator is connected with the feed inlet of the secondary cooling device through a pipeline;

a feed outlet of the secondary cooling device is connected with a feed inlet of the low-valence vanadium oxide hopper through a pipeline; a process water inlet of the secondary cooling device is connected with a process water main pipe; and a process water outlet of the secondary cooling device is connected with a water cooling system;

a feed outlet at the bottom of the low-valence vanadium oxide hopper is connected with a feed inlet of the low-valence vanadium oxide screw feeder; and a feed outlet of the low-valence vanadium oxide screw feeder is connected with a feed inlet of the dissolution and activation reactor through a pipeline;

a clean water inlet of the dissolution and activation reactor is connected with the clean water main pipe; a sulfuric acid solution inlet of the dissolution and activation reactor is connected with a sulfuric acid solution main pipe; and a gas outlet of the dissolution and activation reactor is connected with the tail gas treatment system.

2. A method for preparing a high-purity vanadium electrolyte according to the system of claim 1, comprising the following steps:

introducing vanadium oxytrichloride liquid from the vanadium oxytrichloride storage tank into the ammonium salt precipitating reaction tank through a pipeline, and undergo hydrolysis precipitation together with ammonia liquor from the purified ammonia liquor main pipe and ammonia-rich tail gas from the reduction fluidized bed to form a mixed slurry of ammonium salt precipitate containing ammonium polyvanadate and ammonium metavanadate with an ammonium chloride solution; transmitting a generated flue gas to a tail gas treatment system; introducing the slurry to the washing filter in order to be subjected to washing with clean water and filtration, to obtain washing liquid and ammonium salt precipitate powder; transmitting the washing liquid into a wastewater treatment system; and transmitting the ammonium salt precipitate into the ammonium salt hopper;

introducing the ammonium salt precipitate in the ammonium salt hopper to the ammonium salt screw feeder, the venturi preheater, the secondary cyclone preheater, and the primary cyclone preheater to enter the bed body through the feeder together with the fine powder recovered by the first cyclone separator; introducing purified nitrogen gas from the purified nitrogen gas main pipe into the venturi cooler, the cyclone cooler and the second cyclone separator in order to merge it with purified reducing gas from the gas purifier, and then transmitted into the bed body, such that the ammonium salt precipitate powder material is kept at a fluidized state and reduced to obtain low-valence vanadium oxide powder and ammonia-rich reduction flue gas; introducing the ammonia-rich reduction flue gas to settle through the ammonium chloride settling tower, and then moved to the primary cyclone preheater, the venturi preheater, and the secondary cyclone preheater in order to be subjected to dust removing by the first cyclone separator, and then be mixed with ammonia liquor from the purified ammonia liquor main pipe, and be transmitted into the ammonium salt precipitating reaction tank; introducing the low-valence vanadium oxide to enter the venturi cooler and the cyclone cooler in turn through the discharger, and enter the dissolution and activation reactor through the secondary cooling device, the low-valence vanadium oxide hopper and the low-valence vanadium oxide screw feeder together with the fine powder recovered by the second cyclone separator, and undergo dissolution reaction together with clean water from the clean water main pipe and a sulfuric acid solution from the sulfuric acid solution main pipe under ultrasonic field to obtain the high-purity vanadium electrolyte, wherein the generated acid mist gas is transmitted into the tail gas treatment system.

3. The method for preparing a high-purity vanadium electrolyte according to claim 2, wherein the raw material of vanadium oxytrichloride has a purity of 99%-99.9999%.

4. The method for preparing a high-purity vanadium electrolyte according to claim 2, wherein in the ammonium salt precipitating reaction tank, the mass ratio of the purified ammonia liquor to vanadium oxytrichloride is 0.5-20, the concentration of the ammonia liquor is 15 mol/L, and an operation temperature is 30-90° C.

5. The method for preparing a high-purity vanadium electrolyte according to claim 2, wherein the ammonium salt in the ammonium salt hopper is one or more of ammonium metavanadate, ammonium polyvanadate, and ammonium chloride.

6. The method for preparing a high-purity vanadium electrolyte according to claim 2, wherein the reducing gas introduced into the reducing gas purifier is hydrogen gas or coal gas.

7. The method for preparing a high-purity vanadium electrolyte according to claim 2, wherein in the reduction fluidized bed body, an operation temperature is 400-700° C. in the reduction, and after the reducing gas is purified by the gas purifier, the content of organic substances is less than 1 mg/Nm$^3$, the total solid particle content is less than 2 mg/Nm$^3$, the volume fraction of the reducing gas in the mixed gas of the introduced nitrogen gas and reducing gas is 10%-90%, and the average residence time of the powder is 30-90 min.

8. The method for preparing a high-purity vanadium electrolyte according to claim 2, wherein the high-purity vanadium electrolyte is a mixed electrolyte with the molar concentration ratio of vanadium ions V(III) to V(IV) of 1:1, and the average valence of the vanadium ions is 3.5.

9. The method for preparing a high-purity vanadium electrolyte according to claim 2, wherein the sulfuric acid solution is of electronic-grade purity and has a molar concentration of 4.0-10.0 mol/L.

10. The method for preparing a high-purity vanadium electrolyte according to claim 2, wherein in the dissolution and activation reactor, ultrasound is used to promote dissolution of the low-valence vanadium oxide and activate the vanadium ions, and the dissolution and activation time is 30-300 minutes, the dissolution and activation temperature is 20-45° C., the power density is 10-300 W/L, and the frequency is 28 KHz, 40 KHz or 60 KHz.

\* \* \* \* \*